US007840034B2

(12) United States Patent
Takahashi et al.

(10) Patent No.: US 7,840,034 B2
(45) Date of Patent: Nov. 23, 2010

(54) METHOD, SYSTEM AND PROGRAM FOR AUTHENTICATING A USER BY BIOMETRIC INFORMATION

(75) Inventors: Kenta Takahashi, Kawasaki (JP); Masahiro Mimura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 879 days.

(21) Appl. No.: 11/740,957

(22) Filed: Apr. 27, 2007

(65) Prior Publication Data

US 2007/0286465 A1 Dec. 13, 2007

(30) Foreign Application Priority Data

Jun. 7, 2006 (JP) ............... 2006-158496

(51) Int. Cl.
*G06K 9/00* (2006.01)
*G06K 9/68* (2006.01)
*G06F 21/00* (2006.01)

(52) U.S. Cl. ............... 382/116; 382/115; 382/124; 382/218; 713/186

(58) Field of Classification Search ............... 382/115, 382/116, 124, 218; 713/186
See application file for complete search history.

(56) References Cited

U.S. PATENT DOCUMENTS

| 4,310,827 | A | 1/1982 | Asai | |
|---|---|---|---|---|
| 6,751,734 | B1 * | 6/2004 | Uchida | ............ 713/186 |
| 6,845,453 | B2 * | 1/2005 | Scheidt et al. | ............ 726/5 |
| 6,983,061 | B2 * | 1/2006 | Ikegami et al. | ............ 382/115 |
| 2003/0169910 | A1 * | 9/2003 | Reisman et al. | ............ 382/124 |
| 2005/0210269 | A1 * | 9/2005 | Tiberg | ............ 713/186 |

OTHER PUBLICATIONS

Tulyakov et al., "Symmetric hash functions for fingerprint minutiae", 2005, Workshop on pattern recognition for crime prevention, Security and surveillance, Bath, UI.*
Ohtsuka et al., "A new detection approach for the fingerprint core location using extended relation graph", 2005, IEICE Trans. ED, vol. E88D, No. 10, pp. 2308-2312.*
Oh et al., "Study on the center of rotation method based on minimum spanning tree matching algorithm for fingerprint recognition", 2004, Optical engineering 43(4), pp. 822-829.*
N. K. Ratha, et al.; Enhancing security and privacy in biometrics-based authentication systems; IBM System Journal; 2001; pp. 614-634; vol. 40, No. 3.
Anai Jain, et al.; An Identity Authentication System Using Fingerprints; Proc. Of IEEE, 1997; pp. 1-66; vol. 85, No. 9.

* cited by examiner

*Primary Examiner*—Brian Q Le
*Assistant Examiner*—Soo Jin Park
(74) *Attorney, Agent, or Firm*—Antonelli, Terry, Stout & Kraus, LLP.

(57) ABSTRACT

Upon registration, a client extracts plural feature points and information (identification information) by which each of the feature points can be identified, from a user's fingerprint, and randomly generates a transformation parameter for each feature point to transform the coordinates and direction. The transformed identification information (template) is transmitted to an authentication server and stored in a memory. The identification information and transformation parameters of the feature points are stored in a memory medium of the user. Upon authentication of the user, the client extracts feature points from the user's fingerprint, and identifies the feature points by the identification information in the memory medium. The client transforms the identified feature points by reading the corresponding transformation parameters from the memory medium, and transmits the transformed information to the authentication server. The server verifies the received identification information against the template registered in advance, to authenticate the user.

20 Claims, 9 Drawing Sheets

FIG. 6A FINGERPRINT IMAGE

FIG. 6B MINUTIAE
$M_i : (x_i, y_i, \theta_i)$

FIG. 6C RELATION

FIG. 6D RELATION RADIATION
$R_i : \{(\phi_i^k, \gamma_i^k); k=1,2,\ldots n_i\}$

FIG. 7A

AUTHENTICATION INFORMATION 700

| NO. | x | y | $\theta$ |
|---|---|---|---|
| 1 | 43 | 51 | 62° |
| ⋮ | ⋮ | ⋮ | ⋮ |
| i | $x_i$ | $y_i$ | $\theta_i$ |
| ⋮ | ⋮ | ⋮ | ⋮ |
| N | -55 | -3 | 273° |

FIG. 7B

LABEL INFORMATION 701

| NO. | |
|---|---|
| 1 | (10,3),(85,4),(223,0),(305,1) |
| ⋮ | ⋮ |
| i | $(\phi_i^1, \gamma_i^1), (\phi_i^2, \gamma_i^2), \ldots, (\phi_i^{ni}, \gamma_i^{ni})$ |
| ⋮ | ⋮ |
| N | (11,2),(35,3),(150,0),(224,0),(358,2) |

FIG. 7C

TRANSFORMATION PARAMETER 702

| NO. | $\Delta x$ | $\Delta y$ | $\Delta\theta$ |
|---|---|---|---|
| 1 | 15 | -22 | 40° |
| ⋮ | ⋮ | ⋮ | ⋮ |
| i | $\Delta x_i$ | $\Delta y_i$ | $\Delta\theta_i$ |
| ⋮ | ⋮ | ⋮ | ⋮ |
| N | -8 | 12 | 150° |

FIG. 7D

TRANSFORMED AUTHENTICATION INFORMATION 703

| NO. | x | y | $\theta$ |
|---|---|---|---|
| 1 | 58 | 29 | 102° |
| ⋮ | ⋮ | ⋮ | ⋮ |
| i | $x_i + \Delta x_i$ | $y_i + \Delta y_i$ | $(\theta_i + \Delta\theta_i) \bmod 360°$ |
| ⋮ | ⋮ | ⋮ | ⋮ |
| N | -63 | 9 | 63° |

FIG.8

FIG.9A
RELATION

FIG.9B
MAXIMAL TREE

FIG.9C
DIRECTED GRAPH

FIG.9D
RELATION RADIATION

FIG.10

METHOD, SYSTEM AND PROGRAM FOR AUTHENTICATING A USER BY BIOMETRIC INFORMATION

CLAIM OF PRIORITY

The present application claims priority from Japanese application serial no. 158496/2006 filed on Jun. 7, 2006, the content of which is hereby incorporated by reference into this application.

BACKGROUND OF THE INVENTION

The present invention relates to a method for authenticating a user by biometric information, a program for executing the method, and an authentication system. More particularly, the invention relates to a method and the like for authenticating a user by fingerprint information.

An authentication system using fingerprint information obtains a fingerprint image of a user to extract and register a feature quantity upon registration. This registration information is called a template. Upon authentication, the system newly obtains a fingerprint image from the user to extract a feature quantity, and verifies this against the template to verify the identity of the user. In a system in which a client and a server are connected via a network, a typical example is that a template is maintained by the server in the case of authenticating a user on the client side. The client obtains the user's fingerprint upon authentication, extracts a feature quantity, and transmits the feature quantity to the server. The server verifies the feature quantity against the template to authenticate the user.

However, the template is information by which the user can be identified. Thus, the template needs to be strictly managed as personal information and thereby needs a high management cost. Even if the information is strictly managed, many users are still psychologically hesitant to register a template from the point of view of privacy. Furthermore, the number of fingerprints per user is limited (ten fingers of right and left hands). If the template is leaked and could be forged, the template may not be easily changed unlike the encryption key. In addition, when the same biometric information is registered to a different system, the different system also faces a threat.

To cope with such problems, there may be a method in which the template is encrypted and stored. However, as the method needs to once decode the template upon authentication, it is difficult to prevent leakage caused by sophisticated attacks as well as leakage intentionally caused by a server administrator. Hence, the method is insufficient for the protection of privacy issues.

Thus, there is proposed a method in which upon registration, a feature quantity is transformed by a certain function and a secret parameter that the client has, and is stored in the server as a template which is kept confidential, and upon authentication, a fingerprint feature quantity newly extracted by the client is transformed by the same function and parameter, and is transmitted to the server that verifies the received feature quantity against the template both in the transformed state. This method is called cancelable biometric authentication, which is disclosed, for example, in N. K. Ratha, et al., "Enhancing security and privacy in biometric-based authentication systems", IBM System Journal, Vol. 40, No. 3, 2001.

According to this document, the client secretly holds the transformation parameter. The original feature quantity is still unknown to the server upon authentication, so that the personal privacy is protected. Even if the template is leaked, security can be maintained by regenerating and reregistering the template with the transformation parameter changed. In the case of using the same biometric information to different systems, templates are registered after transformation of different parameters for the respective systems. This makes it possible to prevent the security from being reduced in the other systems, even if one template is leaked. Here, the transformation parameter is equivalent to the key in encryption, which needs to be secretly managed by the client.

As specific methods for realizing the cancelable biometric authentication, two techniques are presented in N. K. Ratha, et al., "Enhancing security and privacy in biometric-based authentication systems", IBM System Journal, Vol. 40, No. 3, 2001. One is a method for dividing a fingerprint image into n×m blocks to use the block substitution as transformation. The other is a method for transforming the x coordinate, y coordinate, and direction angle $\theta$ of a fingerprint feature point by high order polynomial functions, respectively. Here, the fingerprint feature points represent fingerprint ridge endings and bifurcations. The fingerprint verification algorithm, generally called "minutia matching", uses the coordinates (x, y) of feature points and the ridge direction angles $\theta$ at the feature point as the feature quantity.

SUMMARY OF THE INVENTION

With the cancelable biometric authentication disclosed in the above described N. K. Ratha, et al., "Enhancing security and privacy in biometric-based authentication systems", IBM System Journal, Vol. 40, No. 3, 2001, it can be realized by transformation with the block substitution and the high order polynomial function. In the transformation with the block substitution, however, when the coordinates of the feature points upon registration and upon authentication are displaced beyond block boundaries due to displacement or distortion of the fingerprints, the feature points are moved to completely different positions and are mismatched although they should normally be matched, causing degradation in authentication accuracy. To circumvent this problem, it is necessary to make the block width sufficiently large (namely, reduce the number of blocks), which makes it difficult to increase the degree of freedom of the transformation parameter. For example, when the image is divided into 2×2=4 blocks, the sum of patterns of moving the respective blocks (in which overlap is permitted) is 4 multiplied by 4, which equals to 256. As described above the transformation parameter is the secret information equivalent to the encryption key, such 256 (8 bits) patterns are not enough to assure security against brute force attacks and other attacks.

The method using the high order polynomial function transforms a set of the coordinates and direction angles (x, y, $\theta$) of feature points into (f (x), g (y), h ($\theta$)) by high order polynomial functions f, g, h. However, similarly to the case of the block substitution, when the order d of f, g, h is high, feature points are moved to largely different positions due to displacement, and the feature points that should normally be matched may be determined to be mismatched. Meanwhile, in the d-order polynomial that generally has d roots, the coordinates and direction angles of d different feature points may be the same (or very similar) values by transformation, so that the feature points that should not normally be matched may be determined to be matched. As a result the genuine-user rejection rate and other-user acceptance rate may increase, causing degradation of authentication accuracy. Thus it is necessary to make the order d sufficiently small, so it is difficult to increase the degree of freedom of the transformation parameter. For example, with d=2, the number of parameters is 3×3=9. Transformation sufficiently different from that of the original polynomial functions should be realized by changing the parameters, so it is difficult to increase the degree of freedom of each parameter. For example, assuming that each parameter takes two types of values, the total number of combinations of the values of the 9 parameters is 2 multiplied by 9, which equals to 512. Consequently, like the block substitution, this would not be safe against brute force attacks.

It is desirable to realize cancelable biometric authentication with small degradation in accuracy in spite of displacement or distortion of biometric information, and safe against brute force attacks with a sufficiently large degree of freedom of transformation parameter.

A biometric authentication method according to the present invention is a method for authenticating a user by obtaining and registering biometric information of the user into a memory of a verification unit in advance, and by verifying the registered biometric information against biometric information obtained by a feature-point transformation unit. In the registration process of the biometric information, in the feature-point transformation unit, the method obtains a biometric image for registration, extracts feature points for registration and feature point identification information for registration associated with the feature point from the obtained biometric image for registration, generates a transformation parameter independently for the each extracted feature point, transforms the feature point by the transformation parameter to generate a transformed feature point for registration, and transmits the generated transformed feature point for registration to the verification unit to store in the memory. In the authentication process of the biometric information, in the feature-point transformation unit, the method obtains a biometric image for authentication, extracts feature points for authentication and feature point identification information for authentication associated with the feature point from the obtained biometric image for authentication, determines correspondence between the feature point identification information for authentication and the feature point identification information for registration from a relation therebetween, maps the transformation parameter to the each feature point for authentication based on the correspondence, transforms the each feature point for authentication by the transformation parameter determined by the mapping to generate a transformed feature point for authentication, and transmits the transformed feature point for authentication from the feature-point transformation unit to the verification unit. Then in the verification unit, the method verifies the obtained transformed feature point for authentication against the transformed feature point for registration registered in the memory. In a preferred example, n feature points may be independently transformed and verified, respectively. Further, preferably, a relation radiation is extracted and stored with respect to each feature point extracted in the registration process thereby to map the feature points in the registration process and in the authentication process, and the transformation parameter is independently applied to each of the feature points. Further, preferably, the degree of freedom of the transformation parameter is n (the number of feature points) times of the degree of freedom of parameter Pi ($\Delta x_i$, $\Delta y_i$, $\Delta \theta_i$). The present invention is also understood as a program for executing the above described biometric authentication method.

A preferred example of an authentication method according to the present invention is a fingerprint authentication method for authenticating a user by fingerprint information. The method includes the following steps of: in first equipment, obtaining finger information of a user; extracting feature points for registration and feature point identification information for registration associated with the feature point from the obtained fingerprint image; generating a transformation parameter independently for the extracted feature point; mapping the each transformation parameter to the feature point identification information; transforming the feature point by the transformation parameter to generate a transformed feature point for registration; transmitting the transformed feature point for registration from the first equipment to second equipment, and storing the transformed feature point for registration into a memory of the second equipment; in the first equipment, obtaining fingerprint information for authentication; extracting feature points for authentication and feature point identification information for authentication associated with the feature point, from the obtained fingerprint information for authentication; comparing the feature point identification information for authentication with the feature point identification information for registration to search correspondence therebetween; mapping the transformation parameter for authentication to the feature point based on the correspondence, and transforming the feature point for authentication by the transformation parameter determined by the mapping to generate a transformed feature point for authentication; transmitting the transformed feature point for authentication from the first equipment to the second equipment; and in the second equipment, verifying the received transformed feature point for authentication against the transformed feature point for registration stored in the memory. With such a configuration, the fingerprint authentication method authenticates the user according to a verification result.

Further, a preferred example of a fingerprint authentication system according to the present invention includes a client terminal for collecting a user's fingerprint and an authentication server connected to the client terminal via a network to perform a verification process of fingerprint information. The client terminal includes: means for obtaining a fingerprint image for registration or authentication; means for extracting feature points for registration or authentication as well as feature point identification information for registration or authentication that is associated with the feature point, from the obtained fingerprint image; means for generating a transformation parameter independently for the each extracted feature point; means for mapping the each transformation parameter to the feature point identification information; feature-point transformation means for transforming the feature point by the transformation parameter to generate a transformed feature point for registration; means for comparing the feature point identification information for authentication with the feature point identification information for registration to search correspondence therebetween; means for mapping the transformation parameter to the each feature point for authentication based on the correspondence; feature-point transformation means for transforming the each feature point for authentication by the transformation parameter determined by the verification to generate a transformed feature point for authentication; and means for transmitting the transformed feature point for registration and the transformed feature point for authentication to the authentication server. The authentication server includes: a registration unit for registering the transformed feature point for registration transmitted from the client terminal into a memory; and a verification unit for verifying the transformed feature point for authentication transmitted from the client terminal against the transformed feature point for registration stored in the memory. With such a configuration, the fingerprint authentication system authenticates the user according to the verification result of the verification unit.

Further the present invention is a fingerprint device used being connected to certain equipment for performing the fingerprint verification process. The fingerprint device includes: means for obtaining a fingerprint image for registration or authentication; means for extracting feature points for registration or authentication as well as feature point identification information for registration or authentication that is associated with the feature point, from the obtained fingerprint image; means for generating a transformation parameter independently for the each extracted feature point; means for mapping the each generated transformation parameter to the feature point identification information; feature-point transformation means for transforming the feature point by the transformation parameter to generate a transformed feature point for registration; means for comparing the feature point identification information for authentication with the feature point identification information for registration to search correspondence therebetween; means for mapping the transformation parameter to the each feature point for authentication based on the correspondence; feature-point transformation means for transforming the each feature point for authentication by the transformation parameter determined by the mapping to generate a transformed feature point for authentication; and means for transmitting the transformed feature point for registration and the transformed feature point for authentication to the certain equipment, in order to register and authenticate the fingerprints.

According to the present invention, each feature point is identified upon authentication by the feature point identification information extracted upon registration of the biometric information. So it is possible to independently transform the each feature point. The transformation parameter can be set independently for each feature point, and the degree of freedom of the transformation parameter significantly increases. Thus, it is possible to realize cancelable biometric authentication with small degradation in accuracy in spite of displacement or distortion of biometric information, and safe against brute force attacks with a sufficiently large degree of freedom of transformation parameter.

DETAILED DESCRIPTION OF THE PREFERRED EMBODIMENT

Hereinafter, a preferred embodiment of the present invention will be described with reference to the accompanying drawings. In the embodiment, a description will be given of an example of a cancelable fingerprint authentication system of a server-client type that performs authentication with the fingerprint feature quantity kept confidential to the server.

Figure 1:
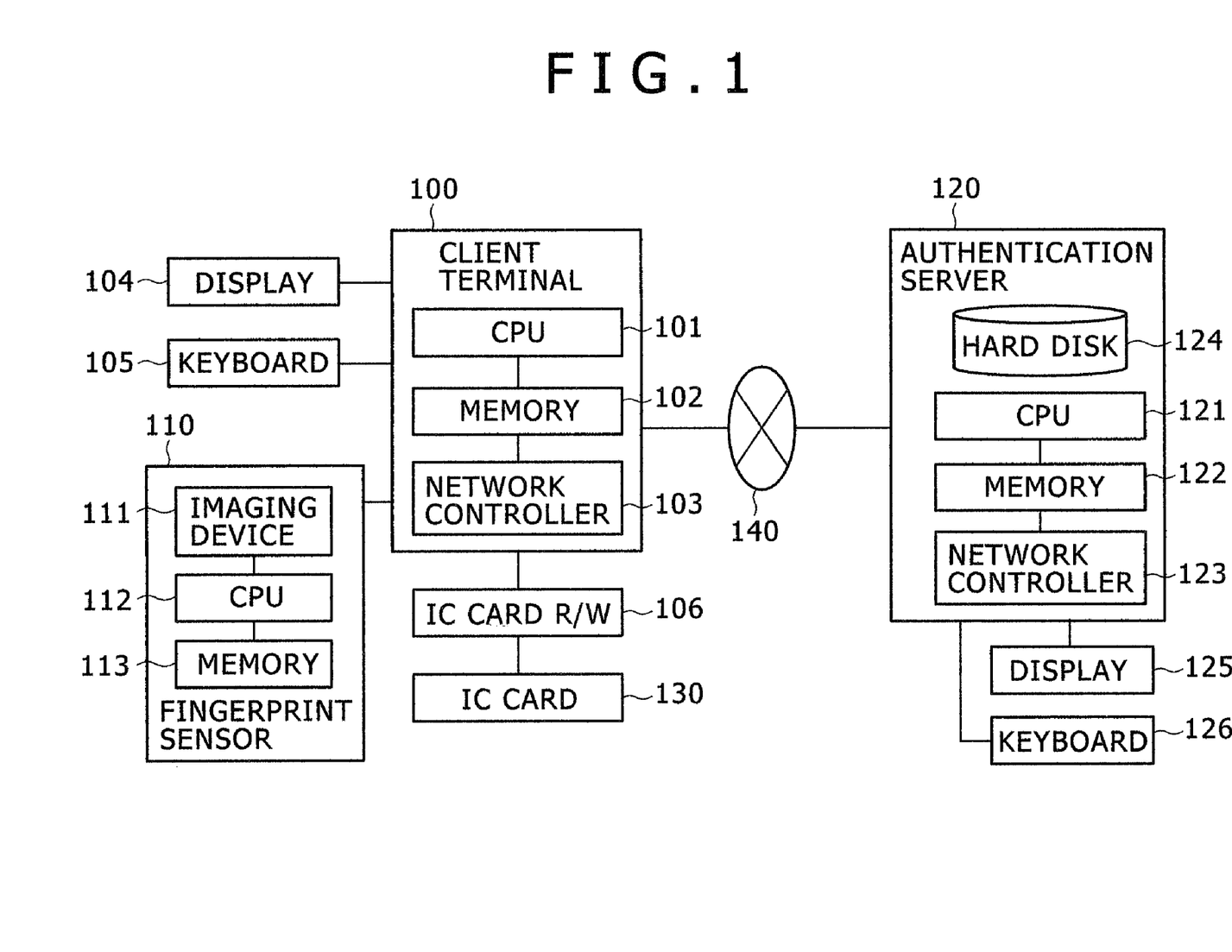
FIG. 1 is a block diagram showing a hardware configuration of a fingerprint authentication system according to an embodiment of the invention.

FIG. 1 shows a hardware configuration to which a fingerprint authentication system is applied according to an embodiment of the invention. The fingerprint authentication system includes a client terminal 100 used for providing a service to a user, and an authentication server 120 for confirming whether the user who receives the service is a normal person. The client terminal 100 and the authentication server 120 are connected via a network 140. In this system, an IC card 130 carried by the user is used. For example, when the authentication system is applied to an Internet banking service, there are connected a PC (personal computer) that the user has in home as the client terminal 100 and a server machine that the bank manages as the authentication server 120, via the network 140 such as the Internet.

The client terminal 100, for example a typical PC, includes a CPU 101, a memory 102, and a network controller 103 in a body thereof to which a display 104, a keyboard 105, an IC card R/W 106, a fingerprint sensor 110 and the like are connected. Here, the fingerprint sensor 110 includes an imaging device 111, a CPU 112, and a memory 113, having a function of obtaining a user's fingerprint as image information. The IC card R/W (read/write) 106 has a function of reading and writing data in the IC card 130. Incidentally, instead of the IC card, there may be used portable recording media having no tamper-resistant and access control function, such as USB memory, flexible disk, portable terminal, magnetic card, and paper (with a two-dimensional bar cord printed thereon). The authentication server 120 includes a CPU 121, a memory 122, a network controller 123, and a hard disk 124, with a display 125 and a keyboard 126 connected thereto.

Figure 2:
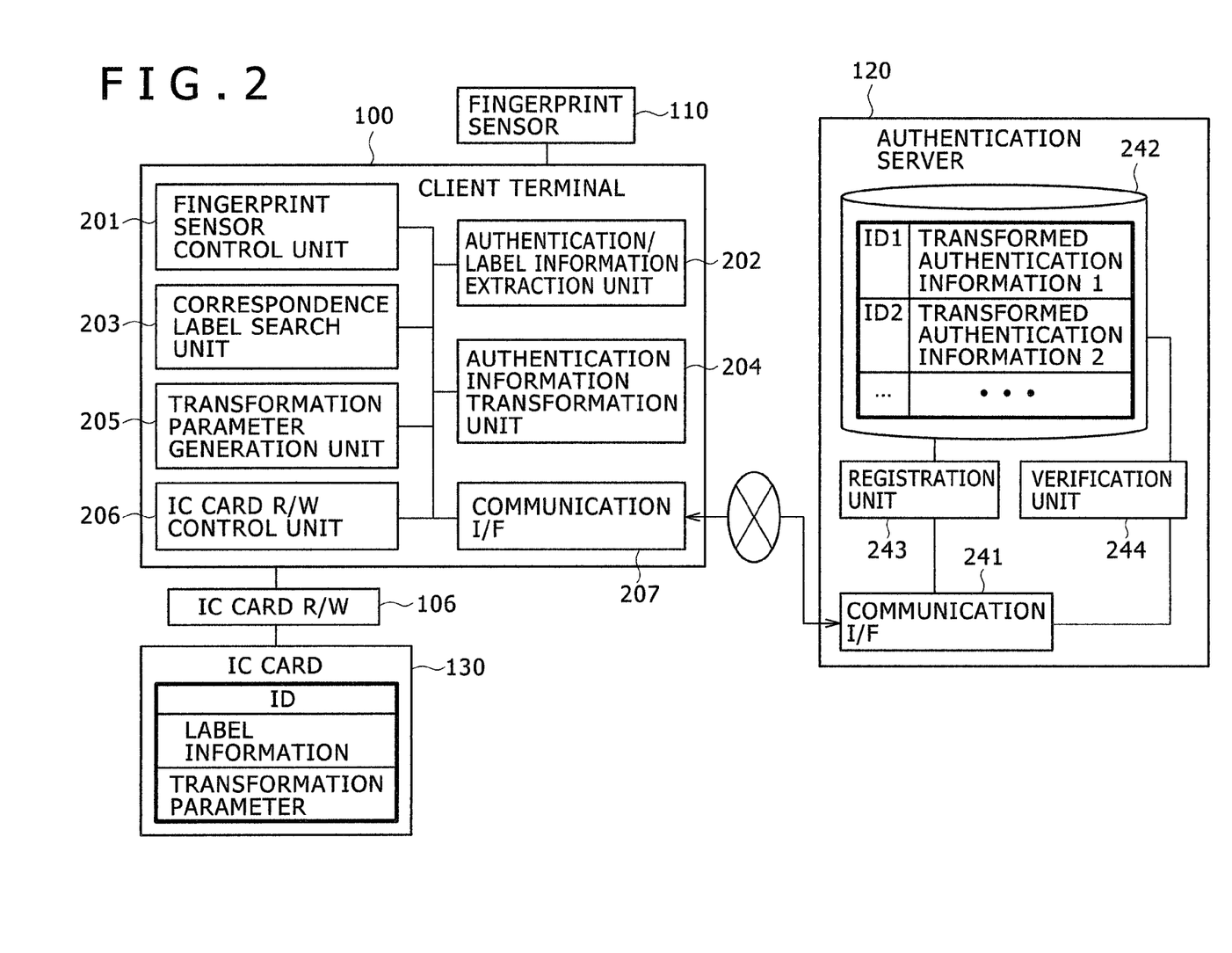
FIG. 2 is a block diagram showing a functional configuration of the fingerprint authentication system according to an embodiment of the invention.

FIG. 2 shows a functional configuration of the fingerprint authentication system in the embodiment. The client terminal 100 includes: a fingerprint sensor control unit 201 for controlling to obtain fingerprint images from the fingerprint sensor 110; an authentication/label information extraction unit 202 for extracting feature points from the obtained fingerprint images, and extracting for authentication information for registration and authentication as well as label information thereof; a correspondence label search unit 203 for searching the label information upon authentication; an authentication information transformation unit 204 for transforming the authentication information by transformation parameters to generate transformed authentication information; a transformation parameter generation unit 205 for generating transformation parameters with respect to each of the feature points of the fingerprint images; an IC card R/W control unit 206; and a communication I/F 207. The functions of the respective units will be understood in more detail by the following description of process operations.

The authentication server 120 includes: a communication I/F 241; a database (DB) 242 for storing the authentication information of the user's fingerprint after transformation according to the corresponding identification information (ID); a registration unit 243 for registering the transformed authentication information (template) into the DB 242; and a verification unit 244 for verification the transformed authentication information generated upon authentication against the template registered in the DB 242. The IC card 130 stores the user's ID, label information, and transformation parameter. The functions of the units are realized by an application program and control program executing in the CPU 101 of the client terminal 100 and in the CPU 121 of the authentication server 120, respectively.

Figure 4:
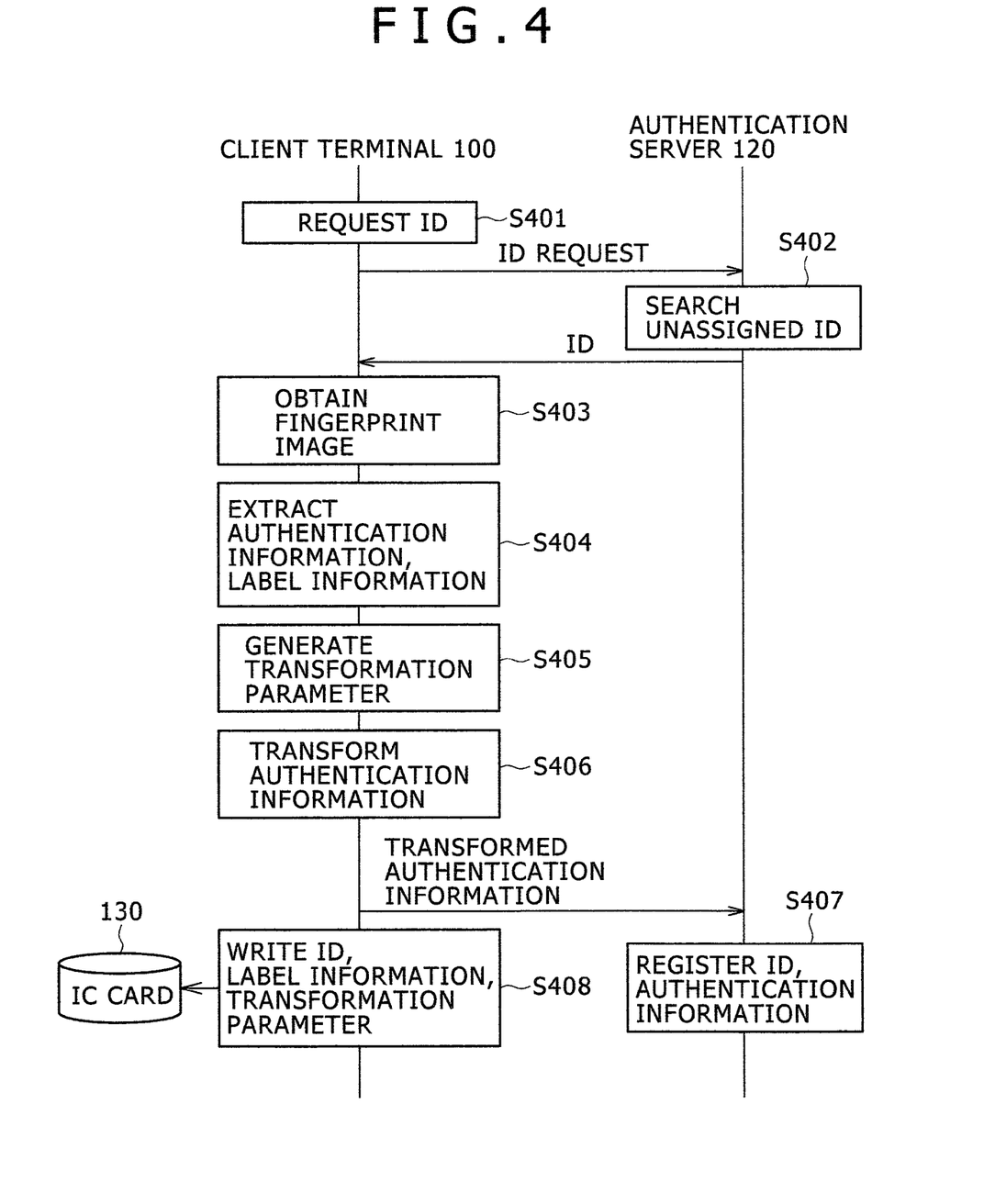
FIG. 4 is a flowchart showing an operation of a fingerprint registration process in an embodiment of the invention.

Next, an operation of a fingerprint registration process will be described with reference to FIG. 4. The client terminal 100 transmits an ID request to the authentication server 120 via the communication I/F 207 (S401). Upon receiving the ID request, the authentication server 120 searches the DB 242 to obtain an unassigned ID, and transmits the ID to the client terminal 100 (S402).

In the client terminal 100, the communication I/F 207 receives the transmitted ID. Under the control of the fingerprint sensor control unit 201, the client terminal 100 obtains a fingerprint image of a user from the finger sensor 110 (S403). Then the authentication/label information extraction unit 202 extracts one or more feature points from the obtained fingerprint image, and assigns numbers to each of the feature points. The authentication/label information extraction unit 202 extracts minutiae and relation radiations with respect to each of the feature points, establishing authentication information for registration by arranging the minutiae in numerical order, as well as establishing label information for registration by arranging the relation radiations in numerical order (S404). The details of the authentication information and label information will be described below with reference to FIGS. 6A to 6D.

The transformation parameter generation unit 205 randomly generates transformation parameters for each of the feature points, and maps the transformation parameters to the feature point numbers (S405). The transformation parameter will be described below with reference to FIGS. 7A to 7D. Here, the transformation parameter may be generated based on an ID input by the user or on a password for the use of the client terminal. In addition to the above, the transformation parameter may be generated based on the personal information of the user, such as the user's address, name, and telephone number.

Then the authentication information transformation unit 204 transforms each of the minutiae in the authentication information for registration by the corresponding transformation parameters to generate transformed authentication information for registration. The generated transformed authentication information for registration (template) is transmitted to the authentication server 120 via the communication I/F 207, together with the assigned ID (S406) The authentication server 120 receives the transformed authentication information for registration and the ID transmitted from the client terminal 100, and registers them into the DB 242 under the execution of the registration unit 243 (S407).

While under the control of the IC card R/W control unit 206, the client terminal 100 writes the ID, label information for registration, and transformation parameters that were transmitted to the authentication server 120, into the IC card 130 (S408). Here, the label information for registration and the transformation parameters are respectively mapped and stored. Incidentally, when the transformation parameter is generated based on the user ID or on the password, there is no need to write the transformation parameter into the IC card.

Figure 5:
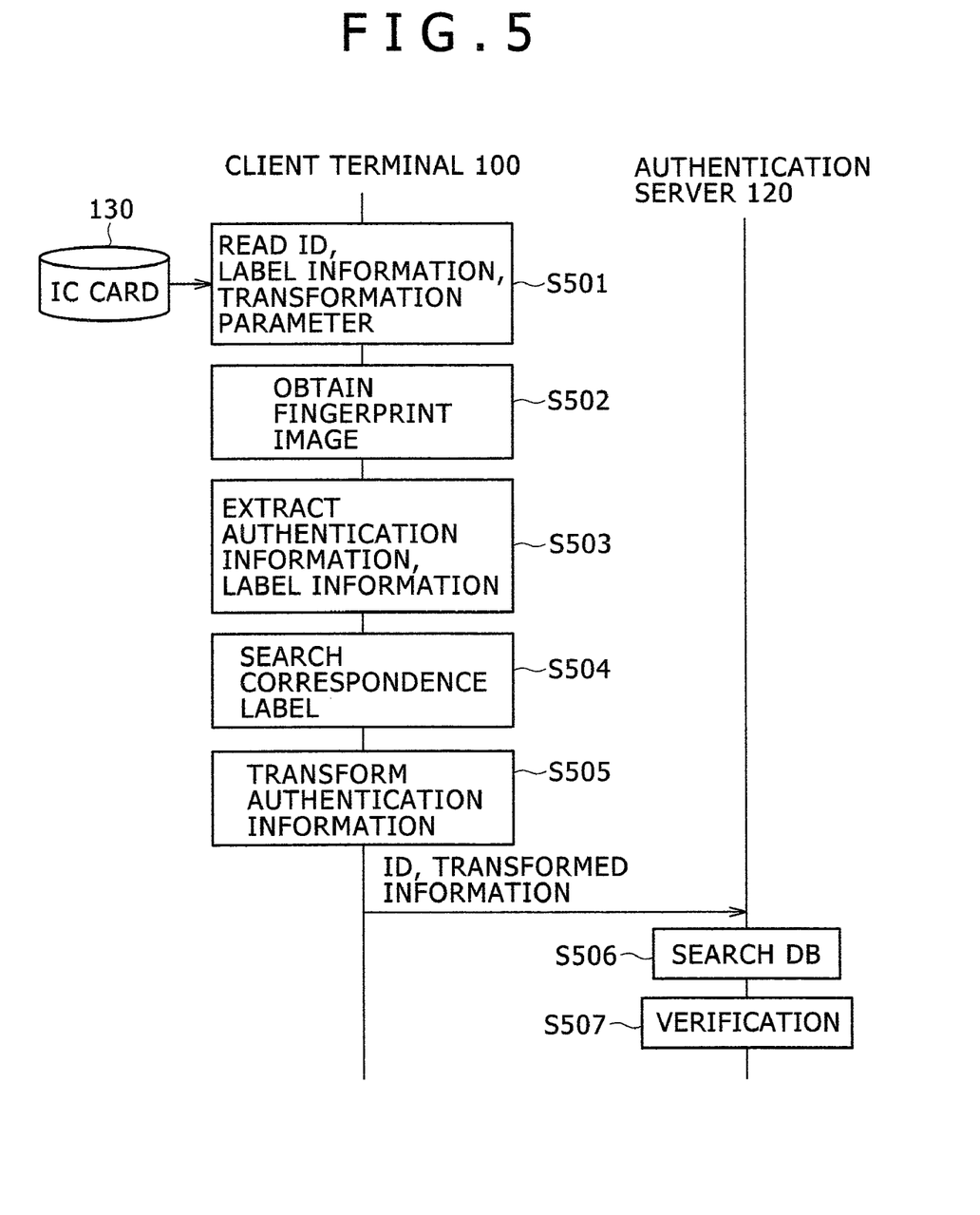
FIG. 5 is a flowchart showing an operation of a fingerprint authentication process in an embodiment of the invention.

Next an operation of a fingerprint authentication process will be described with reference to FIG. 5. In the client terminal 100, the IC card R/W control unit 206 reads the ID, label information for registration, and the transformation parameters from the IC card 130 (S501). Incidentally, the transformation parameter may be generated from the ID or the password. In this case, there is no need to read the transformation parameter from the IC card.

Next, under the control of the fingerprint sensor control unit 201, the client terminal 100 obtains a fingerprint image of the user from the fingerprint sensor 110 (S502). Then the authentication/label information extraction unit 202 extracts feature points from the obtained fingerprint image, and assigns numbers to each of the feature points. The authentication/label information extraction unit 202 extracts minutiae for verifying and relation radiations for verification with respect to each of the feature points, establishing authentication information for verification by arranging the minutiae for verification in numerical order, as well as establishing label information for verification by arranging the relation radiations for verification in numerical order (S503).

Then the correspondence label search unit 203 searches the relation radiations for verifying that match each of the relation radiations of the label information for registration, and stores the correspondences of the numbers (S504). The authentication information transformation unit 204 transforms each of the minutiae in the authentication information for verification by the parameters based on the correspondences of the numbers obtained as a result of the search, thereby to generate transformed authentication information for verification. The generated transformed authentication information for verification is transmitted to the authentication server 120, together with the ID (S505). More specifically, the authentication information transformation unit 204 transforms each minutia in the authentication information for verification by the transformation parameter of the number corresponding to the minutia number.

The authentication server 120 receives the transmitted transformed authentication information for verification together with the ID, and obtains the transformed authentication information for registration stored in advance by searching the DB 242 with the ID as a key (S506). Then under the execution of the verification unit 244, the authentication server 120 verifies the identity of the user by verifying the transformed authentication information for registration against the transformed authentication information for verification (S507). In other words, it is determined whether to accept as a genuine user in the system.

Next, a method for extracting the authentication information and label information will be described with reference to FIGS. 6A to 6D. In addition, data configurations of the authentication information, label information, and transformation parameter will be described with reference to FIGS. 7A to 7D. In the above steps S404 and S503, feature points 6002 are first extracted from a fingerprint image 600. The feature points 6002 are fingerprint ridge endings and bifurcations, which can be extracted by a method, for example, described in A. K. Jain, et al., "An Identity-Authentication System Using Fingerprints", Proc. of IEEE, Vol. 85, No. 9, 1997.

Figure 6A:
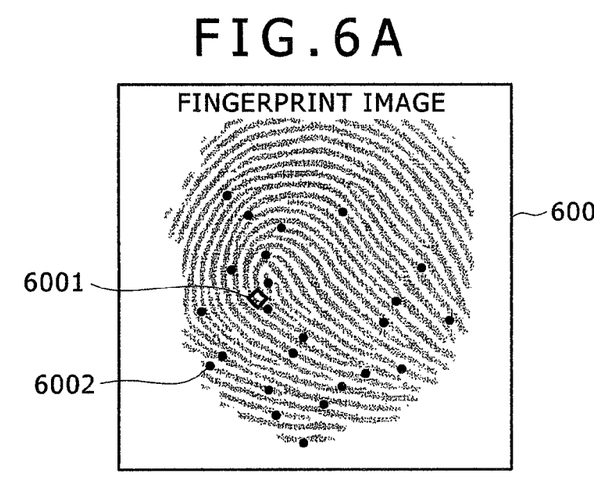
FIGS. 6A to 6D are views for illustrating a process for extracting authentication information and label information in an embodiment of the invention.
Figure 6B:
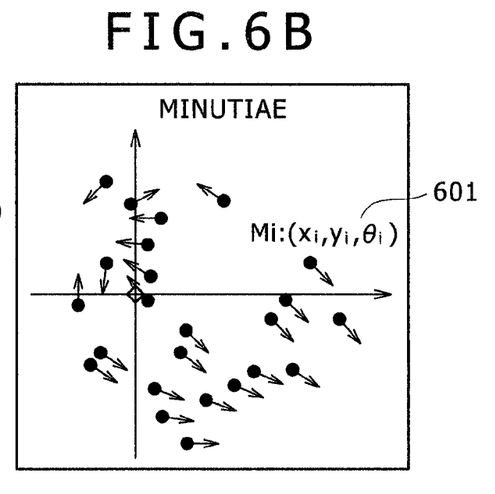

The number of obtained feature points 6002 is denoted by m. The numbers 1 to n ($\geq$m) are appropriately assigned to each of the feature points. Here, n is a predetermined parameter taking an integer value. With the i-th feature point $M_i$, a set of the coordinates ($x_i$, $y_i$) and the ridge direction $\theta_i$ at $M_i$, ($x_i$, $y_i$, $\theta_i$), is referred to as a minutia. The original point (0, 0)

of the coordinate system used herein, for example, may be a core (whorl center: indicated by a diamond symbol) 6001.

Figure 7A:
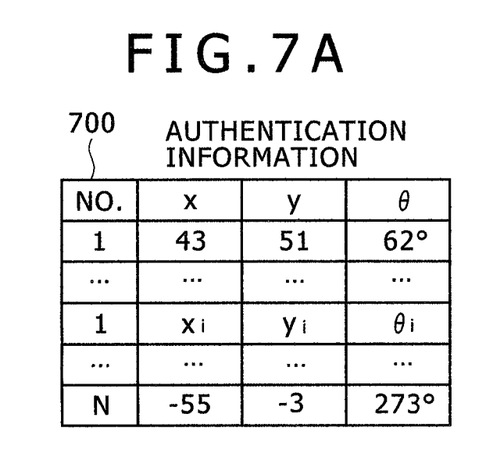
FIGS. 7A to 7D are views showing data configurations of authentication information and label information in an embodiment of the invention.

In FIG. 7A, authentication information 700 is the data of the minutia $(x_i, y_i, \theta_i)$ arranged with respect to $i=1, 2, \ldots, n$. Incidentally, when $n>m$, $(n-m)$ dummy minutiae $(0, 0, 0)$ may be added to the authentication information 700. In this case, the numbers of the dummy minutiae are each determined by randomly selecting the $(n-m)$ numbers in the range from 1 to n.

Figure 6C:
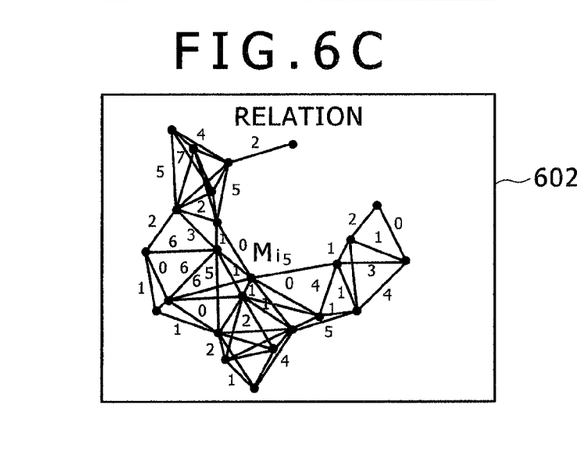

Meanwhile, two adjacent feature points $M_i$, $M_j$ within a predetermined distance are connected by a branch (line). The number of ridges where the branches intersect is assigned as a weight. In this way a graph configuration (relation 602) is generated. A method for generating the relation 602 is described in detail, for example, in U.S. Pat. No. 4,310,827 (JP-A No. 138174/1980).

Figure 6D:
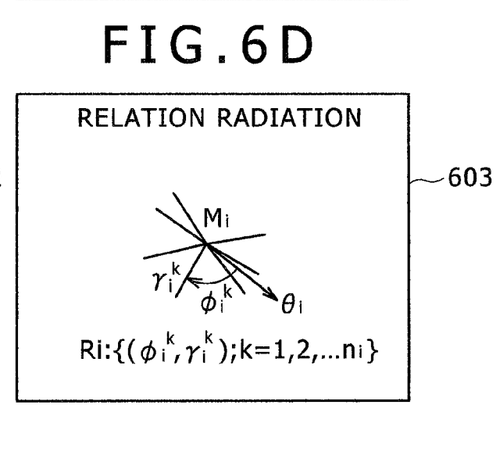
Figure 7B:
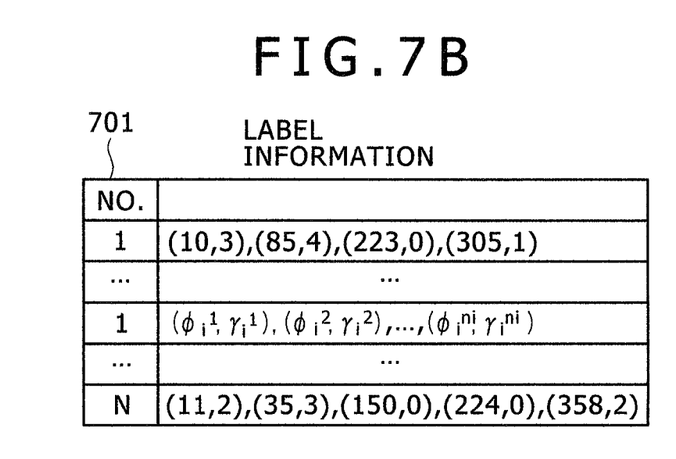

In the relation 602, the number of branches connected to the feature point $M_i$ is denoted by $n_i$, and each branch is denoted by $e_{ik}$ ($k=1, \ldots, n_i$). The direction angle of $e_{ik}$ with the ridge direction $\theta_i$ at $M_i$ as reference is denoted by $\phi_{ik}$, the weight of $e_i$ (the number of intersecting ridges) by $r_{ik}$. Data $R_i$ of $(r_{ik}, \phi_{ik})$ arranged with respect to $k=1, \ldots, n_i$, is referred to as relation radiation. Label information 701 is data of the relation radiation $R_i$ arranged with respect to $i=1, 2, \ldots, n$. For the dummy minutiae, the relation radiation $R_i$ is randomly generated using random numbers for $n_i$, $r_{ik}$, $\phi_{ik}$. By adding the dummy relation radiation, the original fingerprint information is unlikely to be reproduced even if the label information for registration is leaked. As a result the system security can be further increased.

Figure 7C:
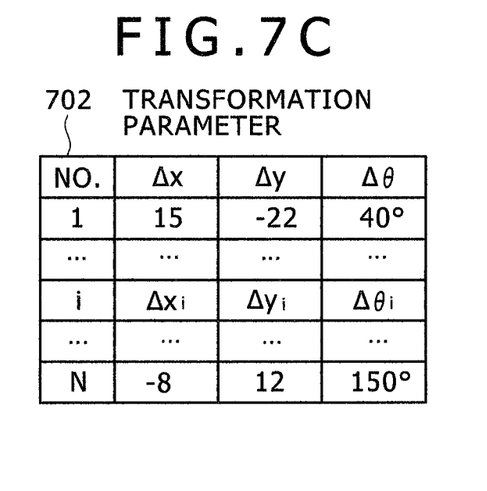

In step S405, a set of three random numbers, $P_i$ ($\Delta x_i$, $\Delta y_i$, $\Delta \theta_i$), is generated independently with respect to $i=1, 2, \ldots, n$. This is arranged to generate data of a transformation parameter 702.

Figure 7D:
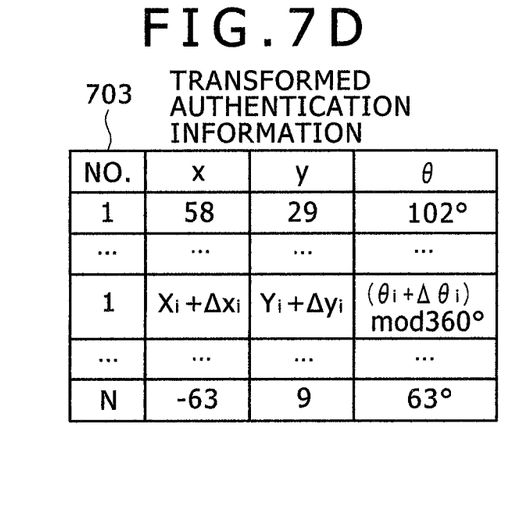

Further in step S406, the minutia of $M_i$ $(x_i, y_i, \theta_i)$ is transformed into $(x_i+\Delta x_i, y_i+\Delta y_i, \theta_i+\Delta \theta_i)$. This is arranged with respect to $i=1, 2, \ldots, n$ to generate data of transformed authentication information for registration. However, when $\theta_i+\Delta_i$ exceeds 360 degrees ($2\pi$ radian) where $\theta_i$ and $\Delta_i$ are angles, the remainder of the division by 360 degrees ($2\pi$ radian) is used. Similarly for $x_i+\Delta x_i$ and $y_i+\Delta y_i$, the remainder of the division by a predetermined value may be used.

Further in step S505, when the i-th relation radiation $R_i$ in the label information for registration matches the j-th relation radiation in the label information for verification, the j-th minutia $(x'_j, y'_j, \theta'_j)$ is transformed by $P_i$ into $(x'_j+\Delta x_i, y'_j+\Delta y_i, \theta'_j+\Delta \theta_i)$. This is arranged with respect to $i=1, 2, \ldots, n$ to generate data of transformed authentication information for authentication. Incidentally when no relation radiation matches $R_i$, the information indicating the absence of a match is substituted therein (for example $(-1, -1, -1)$).

The match determination of the relation radiations $R_i$, $R'_j$ in step S504 can be realized, for example, by the following procedure. The relation radiations $R_i: \{(r_{ik}, \phi_{ik})|k=1, \ldots, n_i\}$ and $R'_j: \{(r'_{jl}, \phi'_{jl})|l=1, \ldots, n'_j\}$ are sorted with respect to $\phi_{ik}$, $\phi'_{jl}$. The correspondence cost of the branches $(r_{ik}, \phi'_{ik})$, $(r'_{jl}, \phi'_{jl})$ is set to 0 when $(r_{ik}=r'_{jl}\wedge|\phi_{ik}-\phi'_{jl}|<\phi_{max})$ and otherwise set to 1, where $\phi_{max}$ is a predetermined threshold. Then the correspondence cost of $R_i$, $R'_j$ is determined by a dynamic programming. The relation radiations are determined to be matched when the correspondence cost is below the predetermined threshold, otherwise the relation radiations are determined to be mismatched.

Further, in step S507, the verification process of the transformed authentication information can be realized by the following procedure. The i-th minutia of the transformed authentication information for registration and the i-th minutia of the transformed authentication information for verification are compared with each other. The number of matched minutiae is defined as the degree of similarity. It is accepted when the degree of similarity exceeds a predetermined threshold, otherwise it is rejected. The match/mismatch between the minutiae $(x, y, \theta)$ and $(x', y', \theta')$ can be determined, for example, by $(x-x')^2+(y-y')^2+C(\theta-\theta')^2<T$ (where C is a predetermined coefficient, T is a predetermined threshold).

Figure 8:
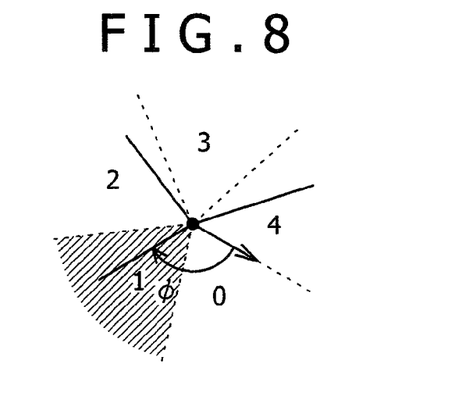
FIG. 8 is a view for illustrating an angle dispersion method in a relation radiation extraction process in an embodiment of the invention.

Incidentally if the label information is leaked in the embodiment, the relation radiation 602 could be reconstructed from the relation radiation 603 by a third party, which could be a clue to reproduce the original fingerprint information. More specifically, the following attack would occur to reconstruct the relation 602. Assuming that $k$ ($\geq 3$) feature points make a k-sided polygon in the relation 602 (when the graph includes a closed path of k branches), the sum of the inner angles should be $(k-2)\pi$. Taking advantage of this condition, k relations are selected from the n relation radiations in a brute force manner. Further two branches are selected from each of the relations in a brute force manner. Then the k-sided polygon included in the relation 602 is estimated by searching a combination so that the sum of the angles made by the two branches is $(k-2)\pi$. In order to prevent such an attack, as shown in FIG. 8, the direction $\phi_{ik}$ may be discretized into a finite number of values (5 in the figure) upon generation of the relation radiation.

Similarly in order to prevent the above attack, the branches of the relation radiation 603 may be thinned out so that the graph includes no closed path. The specific method will be described with reference to FIGS. 9A to 9D. First assuming that a relation 900 is a graph, a maximal tree 901 is obtained. The maximal tree is a graph that includes all the apexes of the graph and has the maximum number of branches of the partial graph including no closed path. A known example of a method for calculating the maximal tree is Kruscal algorithm.

Figure 9A:
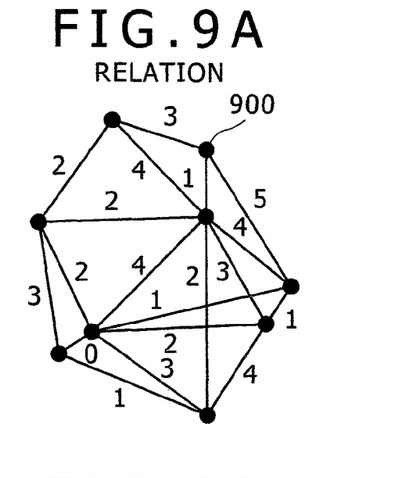
FIGS. 9A to 9D are views for illustrating a branch thinning method in the relation radiation extraction process in an embodiment of the invention.
Figure 9B:
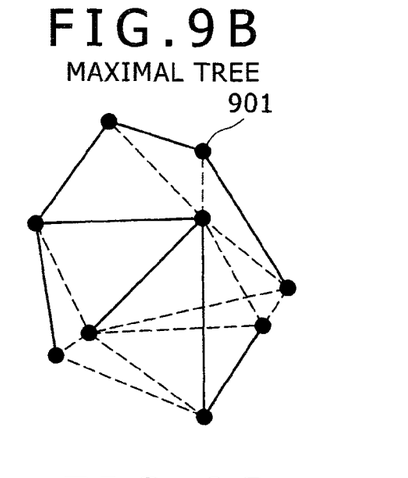
Figure 9C:
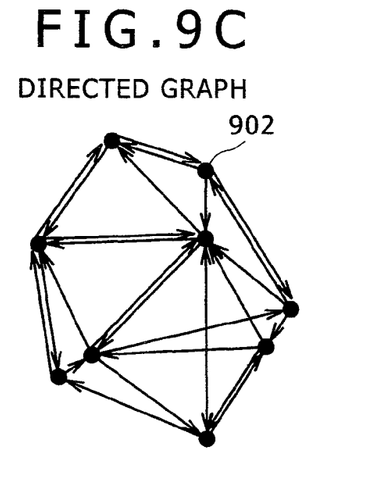
Figure 9D:
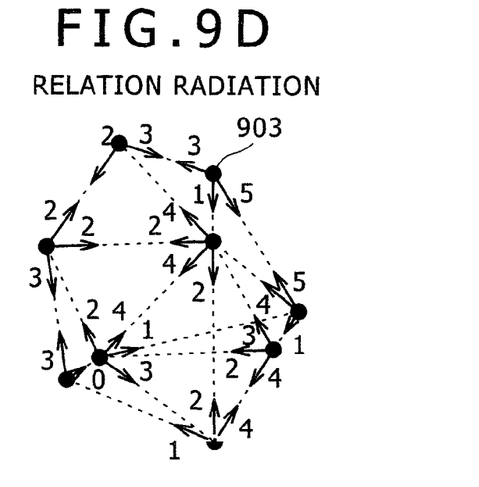

Next, the branches not included in the maximal tree are defined as directed branches each extending from one feature point to another feature point. The branches included in the maximal tree are doubled and defined as directed branches each extending in both directions. In this way a directed graph 902 is generated. Next, with respect to each feature point $M_i$, a directed branch from the feature point to another feature point is denoted by $e_{ik}$ ($k=1, \ldots, n_i$). The direction of $e_{ik}$ with the ridge direction $\theta_i$ at $M_i$ as reference is denoted by $\phi_{ik}$, and the weigh of $e_i$ (the number of intersecting ridges) is denoted by $r_{ik}$. The data $R_i$ of $(r_{ik}, \phi_{ik})$ arranged with respect to $k=1, \ldots, n_i$, is defined as the relation radiation of $M_i$.

By thinning out the branches to be included in the relation radiation as described above, even if any k feature points are selected from the n relation radiations and any two branches are selected from each of the relation radiations, they do not make a k-sided polygon (closed path). Thus the relation is unlikely to be reconstructed by the above attack.

On the other hand, when the branch $e_{ik}$ included in the relation radiation of the feature point $M_i$ and the branch $e_{jl}$ included in the relation radiation of the feature point $M_j$ are identical in the relation 602, $r_{ik}=r_{jl}$ should be satisfied. This condition may be used as a constraint condition for the reconstruction of the relation 602. Thus the reminder when the weight of $e_i$ as $r_{ik}$ (the number of intersecting ridges) is divided by a predetermined integer (e.g., 5) can be used to make difficult the reconstruction by the constraint condition.

Further, in order to prevent the reconstruction by the condition of $r_{ik}=r_{jl}$, it is possible to thin out the branches so that any two relation radiations do not share the same branch. The specific procedure will be described below. Upon generation of the relation radiation, first assuming that the relation 602 is a graph, all the branches of the graph are defined as directed branches each extending from one feature point to another feature point. In this way a directed graph is generated.

Next, with respect to each feature point Mi, the directed branch from the feature point to another feature point is denoted by eik (k=1, ..., ni). The direction of eik with the ridge direction θi at Mi as reference is denoted by φik, and the weight ei (the number of intersecting ridges) by rik. The data Ri of (rik, φik) arranged with respect to k=1, ..., ni, is defined as the relation radiation of the feature point Mi.

As described above, by thinning out the branches to be included in the relation radiation, the branch connecting the feature point Mi and the feature point Mj in the relation 602 is included only in the relation radiation Ri of Mi or in the relation radiation Rj of Mj. This can make it difficult to use the constraint condition for reconstruction of the relation 602.

Figure 10:
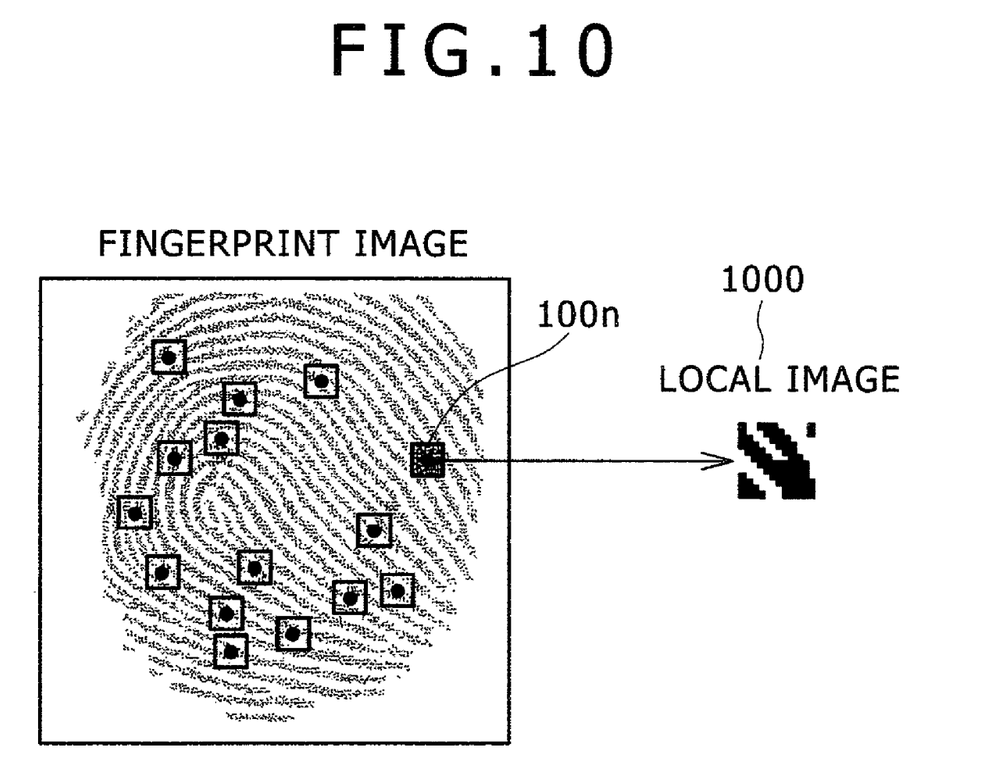
FIG. 10 is a view for illustrating a method for using a local image as the label information in an embodiment of the invention.

Incidentally, as shown in FIG. 10, the label information used in the embodiment may be a local image 1000 of a fingerprint around each feature point 100n. In this case, the correspondence label search in step S504 can be realized by determining the match/mismatch between local images by the correlation value or Hamming distance between the images, and the like.

According to the embodiment as described above, the original authentication information is completely unknown from the transformed authentication information to be registered to the authentication server. In fact, the difficulty of reproduction of the transformed authentication information is dependent on the degree of freedom of the transformation parameter. In the embodiment, the degree of freedom of the translation parameter is n (the number of feature points) times of the degree of freedom of parameter Pi (Δxi, Δyi, Δθi), which is sufficiently large. For example, assuming that Δxi, Δyi, Δθi randomly take either of two values (the degree of freedom of 1 bit) respectively, and that the number of feature points extracted from one fingerprint is n=40, the degree of freedom of the parameter is 3×40=120 bits. This would be strong enough to withstand brute force attacks.

The reason why the transformation with such a large degree of freedom can be realized is that each of the n feature points can be transformed and verified independently. Generally, in the fingerprint authentication, often not all the feature points are extracted properly due to influences such as distortion, blur, and noise occurring when the fingerprint image is obtained. Even if the feature points are successfully extracted, their coordinates and directions are unstable. For this reason, the correspondence between the feature point extracted upon registration and the feature point extracted upon verification is generally unclear. With the earlier cancelable fingerprint verification algorithm, it has been difficult to perform transformation for feature points respectively by different parameters. Thus, there has been no other choice but to apply the same transformation parameter to all the feature points, resulting in a limited degree of freedom in the transformation parameter. However, according to the embodiment, the relation radiation is extracted and stored with respect to each feature point extracted upon registration. This makes it possible to map the feature points upon registration and upon verification. Thus, the transformation parameter can be applied independently to each feature point.

The coordinates of the feature points are not identified only from the registration label information (the relation radiations). In addition, no adjacent two feature points are identified, so that it is difficult to reconstruct a network configuration similar to the relation 602. Thus, in the embodiment, even if the label information and the transformation parameter are leaked from the client, the fingerprint information may not be reproduced based on the leaked information and the parameter (it should be noted that the transformation parameter is a value generated independently of the fingerprint information). Also, even if the transformed authentication information for registration is leaked from the server, the original fingerprint information may not be reproduced. As described above, by using the embodiment, it is possible to establish the fingerprint authentication system which is safe from the threat of leakage of fingerprint information. Furthermore, the fingerprint authentication system is very protective of privacy as the user can receive authentication with the fingerprint information kept confidential to the server.

The biometric authentication according to the embodiment is applicable to an arbitrary application for authenticating a user. Particularly, it can increase security and privacy in authentication via a network. For example, it is applicable to information access control in corporate networks, identity verification in Internet banking systems or ATMs (Automated Teller Machines), login to members Web sites, and user authentication necessary for entering protected areas.

Figure 3:
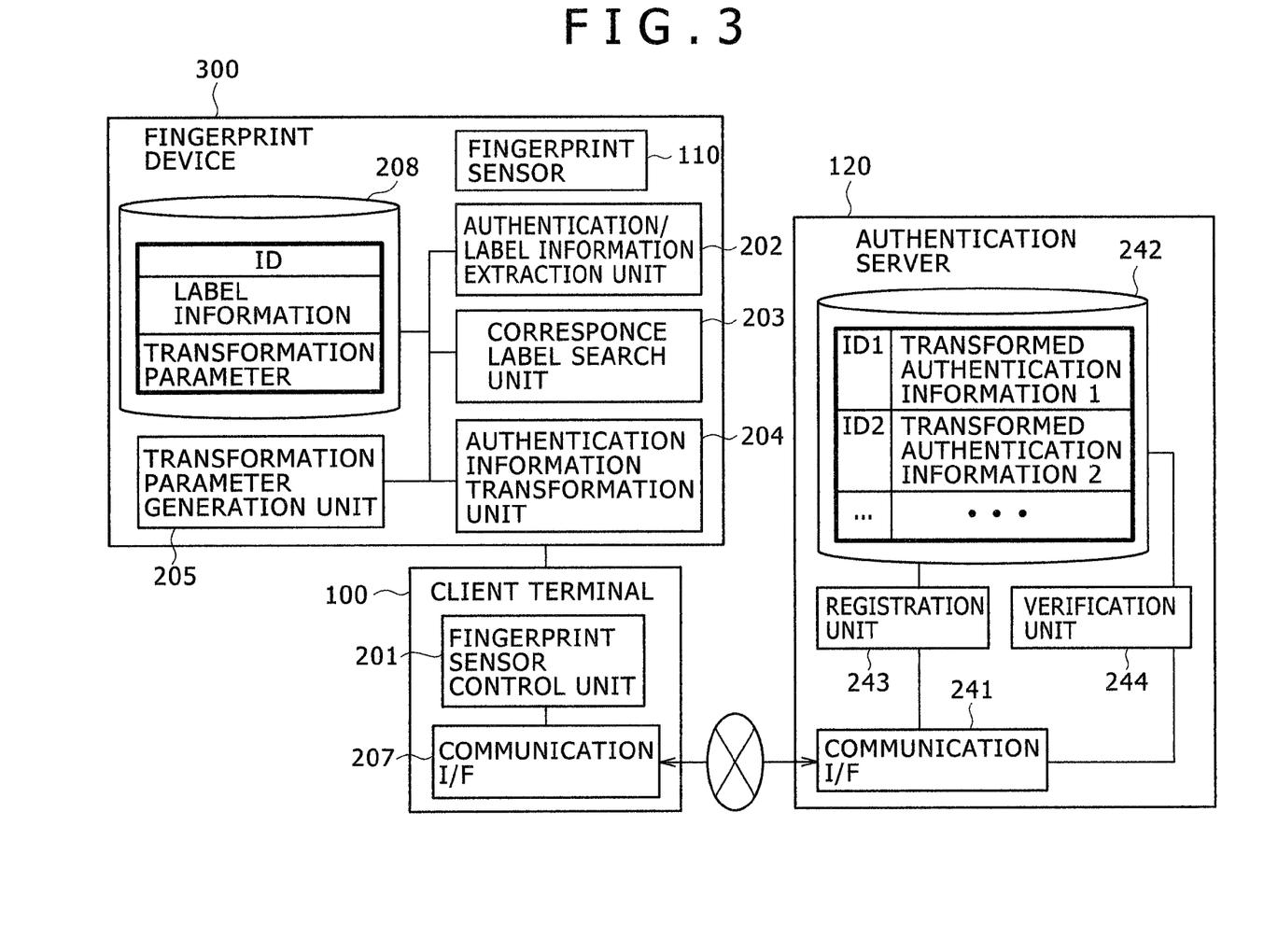
FIG. 3 is a block diagram showing a functional configuration of a fingerprint authentication system according to another embodiment of the invention.

Incidentally, the present invention is not limited to the above described embodiment, and various modifications and applications can be made. For example, as a variant of the functional configuration shown in FIG. 2, the fingerprint device 300 may include, as shown in FIG. 3, the functions of the fingerprint sensor 110, authentication/label information extraction unit 202, correspondence label search unit 203, authentication information transformation unit 204, transformation parameter generation unit 205, and memory 208, all of which are integrally formed therein. In this case, the memory 208 stores the user's ID, label information, and transformation parameter. As another variant, the fingerprint device 300 may include the fingerprint sensor control unit 201 and communication I/F 207 that the client terminal 100 has. This configuration makes it possible to directly exchange various types of information between the fingerprint device 300 and the authentication server 120.

Further, in the above described embodiment, the description has been given to the example of the client-server type authentication system in which the client and the server are connected by the network. However, as another example, it is also applicable to desktop fingerprint authentication device for PC login or others. This can be realized by implementing the fingerprint sensor 110 in FIG. 3 as the desktop fingerprint authentication device, and the function equivalent to the authentication server 120 as PC software. Incidentally, in addition to the above described fingerprint authentication, it would be applicable to authentication of other biometric information as long as having a large number of feature points that cannot be arranged in sequential order, like the ones that the fingerprint has.

What is claimed is:

1. A biometric authentication method for authenticating a user by biometric information, comprising the steps of:
in first equipment, obtaining biometric information of the user and using a computer to perform the steps of:
extracting feature points for registration and feature point identification information for registration associated with the feature points, from the obtained biometric information;
generating transformation parameters independently for the extracted feature points;
mapping the each generated transformation parameter to the feature point identification information;

transforming the feature points by the transformation parameters to generate transformed feature points for registration;

transmitting the transformed feature points for registration from the first equipment to second equipment, and storing the transformed feature points for registration into a memory of the second equipment;

in the first equipment, obtaining biometric information for authentication;

extracting feature points for authentication and feature point identification information for authentication associated with the feature points, from the obtained biometric information for authentication;

comparing the feature point identification information for authentication with the feature point identification information for registration to search the correspondence therebetween;

mapping the transformation parameters to the feature points for authentication based on the correspondence, and transforming the feature points for authentication by the transformation parameters determined by the mapping to generate transformed feature points for authentication;

transmitting the transformed feature points for authentication from the first equipment to the second equipment; and in the second equipment, verifying the received transformed feature points for authentication against the transformed feature points for registration stored in the memory, thereby to authenticate the user according to a verification result.

2. The biometric authentication method according to claim 1, wherein the feature point identification information associated with the feature point includes the number of ridges between the feature point and adjacent feature points in an adjacent area thereto, and a direction of the adjacent feature points from the feature point.

3. The biometric authentication method according to claim 1, wherein the feature point identification information associated with the feature point includes:

the remainder when the number of ridges between the feature point and adjacent points in an adjacent area thereto, is divided by a predetermined integer; and the value obtained when the direction of the adjacent feature points from the feature point is discretized into a predetermined number.

4. The biometric authentication method according to claim 1, further comprising:

in generation of the feature point identification information associated with the feature point, generating a graph by connecting two adjacent feature points within a predetermined distance by a branch, with respect to all the feature points extracted from the biometric image; and defining all the branches of the graph as directed branches extending from one feature point to another feature point, wherein the feature point identification information associated with the feature point includes the number of ridges where the directed branches extending from the feature point to the other feature points intersect each other, and the direction of the directed branches.

5. The biometric authentication method according to claim 1, further comprising:

in generation of the feature point identification information associated with the feature point, generating a graph by connecting two adjacent feature points within a predetermined distance by a branch, with respect to all the feature points extracted from the biometric image;

generating a maximal tree included in the graph; and generating a directed graph by defining the branches not included in the maximal tree as directed branches extending from one feature point to the other feature points, and by doubling the branches included in the maximal tree to define as directed branches extending in both directions, wherein the feature point identification information associated with the feature point includes the number of ridges where the directed branches extending from the feature point to the other feature points intersect each other, and the direction of the directed branches.

6. The biometric authentication method according to claim 1, wherein the feature point identification information associated with the feature point is a local image of the biometric around the feature point.

7. The biometric authentication method according to claim 1, wherein the feature point has information about coordinates (x, y) and a direction angle $\theta$, the transformation parameter includes coordinate variations ($\Delta x$, $\Delta y$) and direction angle variation $\Delta\theta$, the feature-point transformation means transforms the coordinates (x, y) into (x+$\Delta x$, y+$\Delta y$) and the direction angle $\theta$ into $\theta+\Delta\theta$.

8. A biometric authentication system, comprising:

a client terminal for collecting biometric information of a user; and an authentication server connected to the client terminal via a network to perform a verification process of biometric information, the client terminal including:

means for obtaining a biometric image for registration or authentication;

a computer comprising:

means for extracting feature points for registration or authentication as well as feature point identification information for registration or authentication that is associated with the feature point, from the obtained biometric image;

means for generating a transformation parameter independently for the each extracted feature point;

means for mapping the each generated transformation parameter to the feature point identification information;

feature-point transformation means for transforming the feature point by the transformation parameter to generate a transformed feature point for registration;

means for comparing the feature point identification information for authentication with the feature point identification information for registration to search correspondence therebetween;

means for mapping the transformation parameter to the each feature point for authentication based on the correspondence;

feature-point transformation means for transforming the each feature point for authentication by the transformation parameter determined by the mapping to generate a transformed feature point for authentication; and means for transmitting the transformed feature point for registration and the transformed feature point for authentication to the authentication server, the authentication server including:

a registration unit for registering the transformed feature point for registration transmitted from the client terminal into a memory; and a verification unit for verifying the transformed feature point for authentication transmitted from the client terminal against the transformed feature point for registration stored in the memory, thereby to authenticate the user according to the verification result of the verification unit.

9. The biometric authentication system according to claim 8, wherein the feature point identification information associated with the feature point includes the number of ridges between the feature point and adjacent feature points in an adjacent area thereto, and the direction of the adjacent feature points from the feature point.

10. The biometric authentication system according to claim 8, wherein the feature point has information about coordinates (x, y) and a direction angle θ, the transformation parameter includes coordinate variations (Δx, Δy) and direction angle variation Δθ, the feature-point transformation means transforms the coordinates (x, y) into (x+Δx, y+Δy) and the direction angle θ into θ+Δθ.

11. Terminal equipment connected to an authentication server for performing a biometric verification process via a network, the terminal equipment comprising:
   means for obtaining a biometric image for registration or authentication;
   a computer comprising:
   means for extracting feature points for registration or authentication as well as feature point identification information for registration or authentication that is associated with the feature point, from the obtained biometric image;
   means for generating a transformation parameter independently for the each extracted feature point;
   means for mapping the each generated transformation parameter to the feature point identification information;
   feature-point transformation means for transforming the feature point by the transformation parameter to generate a transformed feature point for registration;
   means for comparing the feature point identification information for authentication with the feature point identification information for registration to search correspondence therebetween;
   means for mapping the transformation parameter to the each feature point for authentication based on the correspondence;
   feature-point transformation means for transforming the each feature point for authentication by the transformation parameter determined by the mapping to generate a transformed feature point for authentication; and
   means for transmitting the transformed feature point for registration and the transformed feature point for authentication to the authentication server, in order to register and authenticate the biometric information.

12. The terminal equipment according to claim 11, wherein the feature point has information about coordinates (x, y) and a direction angle θ, the transformation parameter includes coordinate variations (Δx, Δy) and direction angle variation Δθ, the feature-point transformation means transforms the coordinates (x, y) into (x+Δx, y+Δy) and the direction angle θ into θ+Δθ.

13. A biometric device used being connected to certain equipment for performing a biometric verification process, comprising:
   means for obtaining a biometric image for registration or authentication;
   a computer comprising:
   means for extracting feature points for registration or authentication as well as feature point identification information for registration or authentication that is associated with the feature point, from the obtained biometric image;
   means for generating a transformation parameter independently for the each extracted feature point; means for mapping the each generated transformation parameter to the feature point identification information;
   feature-point transformation means for transforming the feature point by the transformation parameter to generate a transformed feature point for registration;
   means for comparing the feature point identification information for authentication with the feature point identification information for registration to search correspondence therebetween;
   means for mapping the transformation parameter to the each feature point for authentication based on the correspondence;
   feature-point transformation means for transforming the each feature point for authentication by the transformation parameter determined by the mapping to generate a transformed feature point for authentication; and
   means for transmitting the transformed feature point for registration and the transformed feature point for authentication to the certain equipment, in order to register and authenticate the biometric information.

14. The biometric device according to claim 13, wherein the feature point identification information associated with the feature point includes the number of ridges between the feature point and adjacent feature points in an adjacent area thereto, and a direction of the adjacent feature points from the feature point.

15. The biometric device according to claim 13, wherein the feature point has information about coordinates (x, y) and a direction angle θ, the transformation parameter includes coordinate variations (Δx, Δy) and direction angle variation Δθ, the feature-point transformation means transforms the coordinates (x, y) into (x+Δx, y+Δy) and the direction angle θ into θ+Δθ.

16. A biometric authentication method for authenticating a user by obtaining and registering biometric information of the user into a memory of a verification unit in advance, and by verifying the registered biometric information against biometric information obtained by a feature-point transformation unit, the biometric authentication method comprising:
   in the registration process of the biometric information, in the feature-point transformation unit, obtaining a biometric image for registration;
   a computer to perform the steps of:
   extracting feature points for registration and feature point identification information for registration associated with the feature point, from the obtained biometric image for registration;
   generating a transformation parameter independently for the each extracted feature point; transforming the feature point by the transformation parameter to generate a transformed feature point for registration;
   transmitting the generated transformed feature point for registration to the verification unit to store in a memory;
   in the authentication process of the biometric information, in the feature-point transformation unit, obtaining a biometric image for authentication;
   extracting feature points for authentication and feature point identification information for authentication associated with the feature point, from the obtained biometric image for authentication;
   determining correspondence between the feature point identification information for authentication and the feature point identification information for registration from a relation therebetween;

mapping the transformation parameter to the each feature point for authentication based on the correspondence;

transforming the each feature point for authentication by the transformation parameter determined by the mapping to generate a transformed feature point for authentication;

transmitting the transformed feature point for authentication from the feature-point transformation unit to the verification unit; and in the verification unit, verifying the obtained transformed feature point for authentication against the transformed feature point for registration registered in the memory.

17. The biometric authentication method according to claim 16, further comprising independently transforming and verifying n feature points, respectively.

18. The biometric authentication method according to claim 16, further comprising:

extracting and storing a relation radiation with respect to each feature point extracted in the registration process;

mapping the feature points in the registration process and in the authentication process; and applying the transformation parameter independently for each feature point.

19. The biometric authentication method according to claim 16, wherein the degree of freedom of the transformation parameter is n (the number of feature points) times of the degree of freedom of parameter Pi ($\Delta x_i$, $\Delta y_i$, $\Delta \theta_i$).

20. A non-transitory computer readable medium embodying a program for biometric authentication to authenticate a user by obtaining and registering biometric information of the user into a memory of an authentication server in advance, and by verifying the registered biometric information against biometric information obtained by terminal equipment, the program comprising the steps of:

in the registration process of the biometric information, in the terminal equipment, obtaining a biometric image for registration;

extracting feature points for registration and feature point identification information for registration associated with the feature point, from the obtained biometric image for registration;

generating a transformation parameter independently for the each extracted feature point;

transforming the feature point by the transformation parameter to generate a transformed feature point for registration;

transmitting the generated transformed feature point for registration to the authentication server to store in a memory;

in the authentication process of the biometric information, in the terminal equipment, obtaining a biometric image for authentication;

extracting feature points for authentication and feature point identification information for authentication associated with the feature point, from the obtained biometric image for authentication;

determining the correspondence between the feature point identification information for authentication and the feature point identification information for registration from a relation therebetween;

mapping the transformation parameter to the each feature point for authentication based on the correspondence;

transforming the each feature point for authentication by the transformation parameter determined by the mapping to generate a transformed feature point for authentication;

transmitting the transformed feature point for authentication from the terminal equipment to the authentication server; and in the authentication server, verifying the obtained transformed feature point for authentication against the transformed feature point for registration registered in the memory.

* * * * *